(12) United States Patent
Rueger et al.

(10) Patent No.: US 10,957,356 B2
(45) Date of Patent: Mar. 23, 2021

(54) DATA STORAGE TAPE CARTRIDGE

(71) Applicant: INTERNATIONAL BUSINESS MACHINES CORPORATION, Armonk, NY (US)

(72) Inventors: Erik Rueger, Ockenheim (DE); Markus Schafer, Heiligenmoschel (DE); Stefan Wiedemann, Kaiserslautern (DE); Robert Beiderbeck, Wassenberg (DE); Ole Asmussen, Henstedt-Ulzburg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 16/199,376

(22) Filed: Nov. 26, 2018

(65) Prior Publication Data
US 2020/0168249 A1    May 28, 2020

(51) Int. Cl.
| | |
|---|---|
| *G11B 23/107* | (2006.01) |
| *G11B 23/26* | (2006.01) |
| *G11B 5/40* | (2006.01) |
| *G11B 5/187* | (2006.01) |
| *G11B 5/008* | (2006.01) |
| *G11B 15/67* | (2006.01) |

(52) U.S. Cl.
CPC ........ *G11B 23/107* (2013.01); *G11B 5/00817* (2013.01); *G11B 5/1871* (2013.01); *G11B 5/40* (2013.01); *G11B 15/674* (2013.01); *G11B 23/26* (2013.01)

(58) Field of Classification Search
CPC ......... G11B 23/107; G11B 23/26; G11B 5/40; G11B 5/1817; G11B 5/00817; G11B 15/674
See application file for complete search history.

(56) References Cited

U.S. PATENT DOCUMENTS

| | | | |
|---|---|---|---|
| 6,297,927 B1 | 10/2001 | Rudi | |
| 6,824,090 B2 * | 11/2004 | Imai | G11B 23/037 242/332.7 |
| 7,168,686 B2 * | 1/2007 | Ehrenleitner | B66D 3/22 254/278 |
| 2003/0089809 A1 | 5/2003 | Maekawa et al. | |
| 2003/0189120 A1 * | 10/2003 | Aaron | G11B 23/107 242/348.2 |
| 2004/0007638 A1 | 1/2004 | Rudi et al. | |
| 2004/0159733 A1 * | 8/2004 | Sato | G11B 23/107 242/348 |
| 2007/0025012 A1 | 2/2007 | Sachuk | |
| 2009/0242681 A1 | 10/2009 | Sumiya et al. | |

(Continued)

*Primary Examiner* — William A. Rivera
(74) *Attorney, Agent, or Firm* — Richard A. Wilhelm

(57) ABSTRACT

A data storage tape cartridge includes a housing having a reel within and rotatably supported by the housing. Two or more data storage tapes are wound up on the same rotary axis of the reel. Each subsequent winding of a first one of the tapes is separated from the previous winding of the first tape by at least another one of the other tapes. A leader pin is attached to a free end of each of the tapes. The leader pins may be connected to one another. The leader pins may be disconnected from one another as part of process for mounting the cartridge in a tape drive.

19 Claims, 2 Drawing Sheets

(56) References Cited

U.S. PATENT DOCUMENTS

2011/0163193 A1* 7/2011 Tada .................. G11B 23/042
242/348
2017/0169841 A1 6/2017 Biskeborn
2019/0073252 A1* 3/2019 Tokai .................. G06F 3/0659

* cited by examiner

DATA STORAGE TAPE CARTRIDGE

FIELD

The present invention relates to tape-based data storage media.

BACKGROUND

Magnetic tape data storage is a system for storing digital information on magnetic tape. Magnetic tape is commonly packaged in cartridge. Magnetic tape cartridges are commonly used as a storage medium of choice for video archives, back-up files, replicas for disaster recovery, and retention of information. Magnetic tape cartridges may be stored on the premises of a business, government, or other entity.

The volume of data to be stored has increased tremendously in recent years and continues to increase. Another trend is to store data in the "cloud." As such, storage of data is migrating to cloud services, storage virtualization services, and other off premise locations. Magnetic tape cartridges may be used by providers of cloud services.

Magnetic tape may be manufactured using sputtering technology. While sputtered tapes are expected to cost marginally more to manufacture than current commercial tapes, the potential for very high capacity is predicted to make the cost per terabyte very attractive, making this technology practical for cold storage in the cloud.

SUMMARY

Various embodiments are directed to a data storage tape cartridge includes a housing. A reel is within and rotatably supported by the housing. At least two data storage tapes are wound on the reel around an axis. In a first winding, a first tape wraps around and encloses a second tape. In a subsequent winding, the first tape again wraps around the second tape, while the pair of tapes in the subsequent winding wrap around the tapes of the first winding. The first and second tapes are thus disposed in alternating layers on the reel. Each subsequent winding of a first one of the tapes is separated from a previous winding of the first tape by at least one second tape of the tapes. A leader pin is attached to the free end of each tape. The two or more leader pins may be connected to or detached from one another. The leader pins may be disconnected from one another as part of process for mounting the cartridge in a tape drive.

Various embodiments are directed to a method for mounting a tape cartridge in a tape drive. Various other embodiments are directed to a method for making a data storage tape cartridge.

Embodiments of the invention are given in the dependent claims. Embodiments of the present invention can be freely combined with each other if they are not mutually exclusive.

BRIEF DESCRIPTION OF THE DRAWINGS

In the following, embodiments of the invention are explained in greater detail, by way of example only, making reference to the drawings in which.

The same reference number generally refers to the same components in the embodiments described herein.

DETAILED DESCRIPTION

Figure 1:
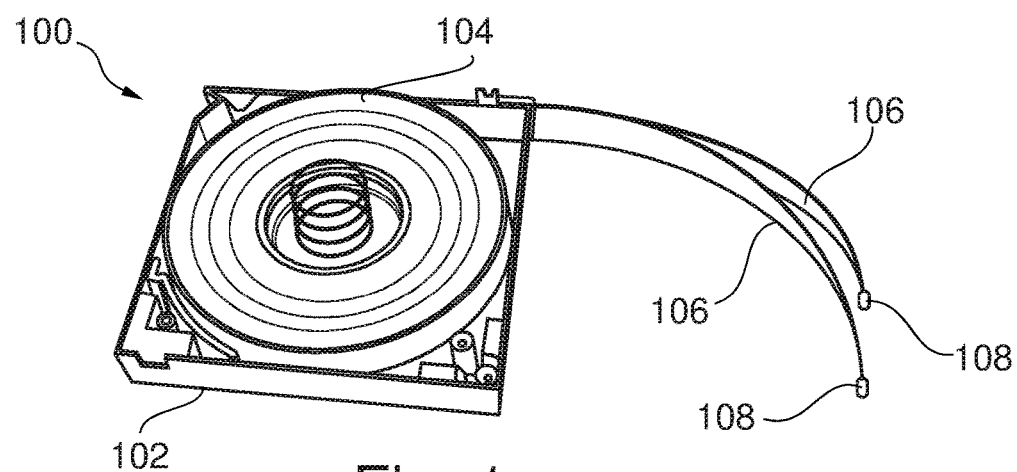
FIG. 1 depicts the interior of a data storage tape cartridge according to various embodiments.

As mentioned, tapes manufactured using sputtering technology have much higher capacity than traditional tapes. It has been found that a full write test of the Linear Tape-Open (LTO) storage technology takes around 8.4 hours to write a full tape with approximately 2 TB capacity. From this, it is expected that the full-write time will increase many times over for a tape media having a capacity on the order of 300 TB and a tape length of typically more than 1000 meters. An analogous scaling behavior is expected for reading the data back from the tape to the application and for locating the tape to a requested logical position.

Various embodiments are directed to a data storage tape cartridge includes a housing. A reel is within and rotatably supported by the housing. At least two data storage tapes are wound on the reel around an axis. In a first winding, a first tape wraps around and encloses a second tape. In a subsequent winding, the first tape again wraps around the second tape, while the pair of tapes in the subsequent winding wrap around the tapes of the first winding. The first and second tapes are thus disposed in alternating layers on the reel. Each subsequent winding of a first one of the tapes is separated from a previous winding of the first tape by at least one second tape of the tapes. A leader pin is attached to the free end of each tape. The two or more leader pins may be connected to or detached from one another. The leader pins may be disconnected from one another as part of process for mounting the cartridge in a tape drive.

Embodiments of the invention may have the advantage of providing the same data storage capacity as an identically dimensioned data storage cartridge with a single tape wound on the reel, but with the tapes having a windable length of merely half or less of the length of the tape in a single-tape cartridge. This may yield a corresponding reduction of access times for locating a requested logical position as well as reading or writing the full data storage capacity of the medium.

An example for the data storage tape cartridge is a magnetic tape cartridge wherein the tapes comprise a magnetizable layer. The materials may be chosen for each component according to known standards, such as polymer films for layers of the tapes (e.g. the substrate of known LTO tapes is made from polyethylene naphthalate), a metal or plastic material for the leader pins, and plastic for the housing and the reel.

According to embodiments, each of the leader pins can comprise a joining structure adapted for detachably joining the leader pins with each other. This may facilitate a more precise and failsafe synchronous pickup and guiding of the tapes, e.g. when mounting the tape in a tape drive. The detachability of the leader pins may enable the use of an individual tape head (e.g., a read-write head) for each of the tapes, allowing for synchronous read-write operations.

Alternatively, the tapes may be used in a single-tape drive with a single-tape head. In this case, the leader pins may stay connected during use, wherein the connected leader pins may be handled as a single leader pin and the two or more tapes may be used as a single tape, with the tape head contacting and operating on the outermost tape only.

According to embodiments, the joining structure comprises a stub and a cavity, the cavity being adapted for receiving the stub for forming the joining of the leader pins. This structure may provide a connection with a high mechanical robustness and simple manufacturability.

According to embodiments, each of the leader pins comprises a cylindrical body, the joining structure being adapted for forming the joining in a radial joining direction of the cylindrical body. Cylindrical leader pins include leader pins with a circular radial cross section (in a plane perpendicular to a primary axis of the cylinder). However, the term "cylindrical" more generally refers to a body comprising a sequence of at least one section along a primary axis, wherein each section has an arbitrary radial cross section which is constant along the primary axis. A cylindrical leader pin may be easy to manufacture and may enable a robust and durable attachment of the tape.

According to embodiments, the leader pins have a rated axial length, the joining structure being adapted for forming the joining of a given one of the leader pins to another one of the leader pins such that the axial length of the joined leader pins is between 95% and 105% of the rated axial length. The rated length may be chosen to match the picker of an existing single-tape drive. This may enable a use of the tape cartridge in an existing tape drive without any hardware modifications to the drive.

According to embodiments, the joining structure comprises a stub and a cavity, the cavity being adapted for receiving the stub for forming the joining of the leader pins, the joining structure of a given one of the leader pins having a radial extension, measured from a radial perimeter of the given leader pin at the axial position of the joining structure, of between 50% and 100% of the radial extension of the radial perimeter in the joining direction.

The long dimensioning of the joining structure may enable a connection of the leader pins with a reduced risk of unintended or uncontrolled detachment. An additional advantage of a cavity extending over 100% of the radial diameter (i.e., the cavity is a through hole) may be the capability to exchange air between the cavity and the environment. This may prevent the buildup of overpressure or underpressure during a movement of the stub in the cavity, and thus enable a simpler connection and detachment of the leader pins. Stub and cavity do not necessarily have to be formed with the same radial extension, so it is possible to design, e.g. the cavity as a through hole and the stub with a radial extension of only 60% of the diameter of the radial perimeter in the joining direction.

According to embodiments, each of the leader pins can comprise a central section and two head sections, the central section comprising two axial ends, each of the head sections being attached to one of the axial ends, the fixation between the tape and the leader pin being located at the central section, the central section having a radial extension in the joining direction of between 50% and 90% of the radial extension of the head section in the joining direction.

A recessed geometry of the central section compared to the head section may result in a gap between the central sections when the leader pins are connected. The space thus provided between the leader pins may receive one or more windings of the tape which is attached to the leader pin, and may therefore prevent the attached tape from blocking the connection. Said gap may further provide additional clearance during a simultaneous pickup of the connected leader pins with two pickers. In addition, the recessed radial dimension of the central section may stabilize the position of the leader pin in axial direction while it is held, e.g. by a picker.

According to embodiments, each of the head sections may be attached to the central section by a neck section, the neck section having a radial extension in the joining direction of between 50% and 90% of the radial extension of the central section in the joining direction. The radial recess of the neck sections relative to both the central section and the head sections may provide a further axial stabilization to reduce play when the leader pin is held by a picker.

According to embodiments, the joining structure may be adapted for forming the joint with a positive fit. While still being a removable connection, a slight positive fit (form fit) may provide the joining structure with the capability to engage. The mechanical restraint thus introduced may increase the force necessary to detach the connected leader pins, and may therefore prevent a spontaneous or unintended separation of the connected leader pins.

According to embodiments, each of the leader pins can comprise a flat face, the joining structure being disposed on the flat face. The flat faces may thus act as the contact faces of the connected leader pins. This may reduce the probability of spontaneous or unintended detachment of the connected leader pins by torsional relative motion of the leader pins.

According to embodiments, the tape cartridge can further comprise a stop, the stop being adapted for receiving at least a given one of the leader pins and for preventing the tape comprising the given leader pin from being further wound up on the reel. A stop may locate the leader pin(s) at a predefined position within the housing when the tapes are fully wound up on the reel of the cartridge. The risk of damage to the tape caused by unrestrained movement of the leader pins inside of the housing, e.g. during transport of the cartridge, may be lowered in this way. The predefined positioning of the leader pins may enable a safe pickup of the leader pins by a picker. Furthermore, a stop may prevent the leader pins from being wound up on the reel with the tape, which may impede a reuse of the cartridge. The leader pins may be caught by the stop in connected or detached state, and there may be two or more stops for receiving one or more of the leader pins in connected or detached state with each of the stops.

According to embodiments, the stop can further comprise an elastic element, the elastic element being adapted for exerting a force on the leader pin received by the stop, the force counteracting a movement of the tape comprising the received leader pin in a wind-up direction of the reel. The elastic element may be pulled or compressed by the received leader pin(s) during windup of the tape on the reel of the cartridge. Compared to a cartridge with a hard stop, this may reduce the risk of damage to the tape due to an inelastic collision of the leader pin(s) with the hard stop when the tape is wound up with a high velocity. An elastic element may further exert a constant force on the leader pin(s) while it is received by the stop, which may prevent spontaneous movements of the leader pin(s), and a potential spontaneous partial unwinding of the tape which might be caused thereby, e.g. during transport of the cartridge.

According to embodiments, the stop can further comprise a lock element, the lock element being adapted for detachably engaging the at least one received leader pin with the stop. The lock element may act as a barrier to prevent spontaneous movements of the leader pin(s), and a potential spontaneous partial unwinding of the tape which might be caused thereby, e.g. during transport of the cartridge. The lock element may confine the leader pin(s) even more effectively if used together with an elastic element as described above, e.g. by providing a means for engaging the leader pin(s) with the stop which is capable of releasing the pin(s) by a picker pressing against the elastic element.

According to embodiments, each of the tapes can comprise a protective layer and an anti-adhesive back coating, the protective layer forming a front face of the tape and the back coating forming a back face of the tape, the tapes being wound up on the rotary axis of the reel with the back face facing the rotary axis of the reel. This may facilitate the unwinding of the tapes from the reel and prevent damage to the tapes which might occur when tearing apart adhering tapes.

According to embodiments, the tape cartridge may further comprise a memory, the memory storing tape-specific information for each of the tapes. This may enable an individual use of each of the tapes according to its current state. Tape-specific information for a given tape may comprise, without limitation, static information such as binary flags descriptive of the presence or absence of certain properties and capabilities of the given tape; an identifier (e.g. unique library code, type designation etc.); a date, company and other features of manufacture; a type of medium (e.g. magnetic, optical etc.); a number of data segments; a length of the tape; or a combination thereof, as well as state-specific information such as a number of empty or damaged sectors or their logical positions; information descriptive of a quality of the last read-write access or the tape drive which used the given tape for the last time; a logical position of the last segment which was ever in contact with a tape head or the first segment which was never in contact with a tape head since manufacture; a number of windings; an error rate; first and last accessible logical positions; or a combination thereof. For instance, a tape-specific index of damaged sectors may allow for skipping a read-write operation for one of the tapes at a position where a damage was listed for that tape, while continuing read-write operations for all other tapes which are not damaged at this position.

According to embodiments, the tape cartridge can comprise a single reel. This may allow for providing a shorter access time while maintaining the same storage capacity as a single-tape cartridge without any changes to the dimensions of the housing. This may enable use of the cartridge in a tape drive without having to change the dimensioning of components of the tape drive. On the other hand, it may still be advantageous to provide the cartridge with two or more reels, with at least one of the reels having wound up thereon at least two data storage tapes on the same rotary axis of the reel as described herein, to increase the data storage capacity of the cartridge.

According to embodiments, each of the tapes can comprise one of the following data storage media: a magnetic film, an optical film, an electro-optical film, a thermoelectric film, a graphene film, and a combination thereof. Embodiments of the present invention maybe implemented without regard to the technology used for storing information on the data storage tapes. Each of the tapes hosted by the same cartridge may implement a different storage technology, or more than one storage technologies may be combined as different storage layers of the same tape.

Now turning to the drawings, FIG. 1 provides a schematic view of the interior of a data storage tape cartridge 100 according to various embodiments. The cartridge 100 comprises a housing 102, a reel 104, and two data storage tapes 106 which are wound up on the reel 104 and have each a leader pin 108 attached to the free end of the respective tape 106. The reel 104 is rotatable around its central axis and supported by the housing 102. The housing 102 further comprises a tape outlet which permits an unwinding of the reel 104 by simultaneous extraction of the leader pins 108 though the tape outlet.

The reel 104 comprises a clearance which is receiving the two tapes 106. The axial dimension of this clearance closely matches the width of the tapes 106, such that the space between the wound up tapes 106 and the axial inner walls of the reel 104 does not exceed 10% of the width of the tapes 106. Both tapes 106 are of an equal width. Correspondingly, the wound up tapes 106 are enclosing each other around the central axis of the reel 104, i.e. the two tapes 106 constitute an inner tape 106 and an outer tape 106. For each winding, the outer tape 106 is wrapping the inner tape 106 around the central axis, and the outer tape 106 is in turn wrapped around the central axis by a subsequent winding of the inner tape 106, if present. Therefore, subsequent windings of one of the tapes 106 are detached by a winding of the other one of the tapes 106.

Compared to a tape cartridge comprising a single tape wound up on a reel of equal dimensions as the reel 104 (a "single-tape cartridge"), the reel 104 has a capacity for winding up the two tapes 106 up to a maximum length which is about half the length of the tape in the single-tape cartridge. Equivalently, it takes only about half the number of turns of the reel 104 to completely wind up the two tapes 106 as it would take to wind up the reel in said single-tape cartridge.

The number of two tapes 106 shown in FIG. 1 has been chosen for illustration purposes only. Following the same principle as illustrated in the Figure, it is alternatively possible to provide the tape cartridge 100 with three, four, or more tapes 106 being wound up on the reel 104. This corresponds, respectively, to a total windable length of one third, one fourth, etc., of the total tape length of a tape in a single-tape cartridge as described before.

Alternatively or additionally, the cartridge 100 may comprise two or more of the reels 104 in the housing 102, wherein at least one of the reels 104 has wound up thereon two or more tapes 106 wrapping in each other around the central axis as described before.

Preferably, the two or more tapes 106 are fixed to the central axis of the reel 104, using, e.g. glue and/or a clamping mechanism. However, a fixation of the tapes 106 on the reel 104 is not essential. This includes implementations where merely a portion of the tapes 106 which are wound up on the reel 104 is fixed to the reel 104 and the remaining portion of the tapes 106 is wrapped around the central axis of the reel 104 without a fixture, being held tightly around the central axis by the pulling force which is brought up by wrapping in the tapes 106 of the loose portion with the tapes 106 of the fixed portion. A reel 104 comprising loose tapes 106 should not be completely unwound so as to maintain the necessary pulling force to keep the one or more loose tapes 106 in position.

The data storage tape cartridge 100 may comprise further units or elements which are not depicted in FIG. 1, such as a cartridge memory, one or more stops for receiving one or more of the leader pins 108, labels on one of the outer faces of the housing 102, and any further unit or element known in the art.

Figure 2:
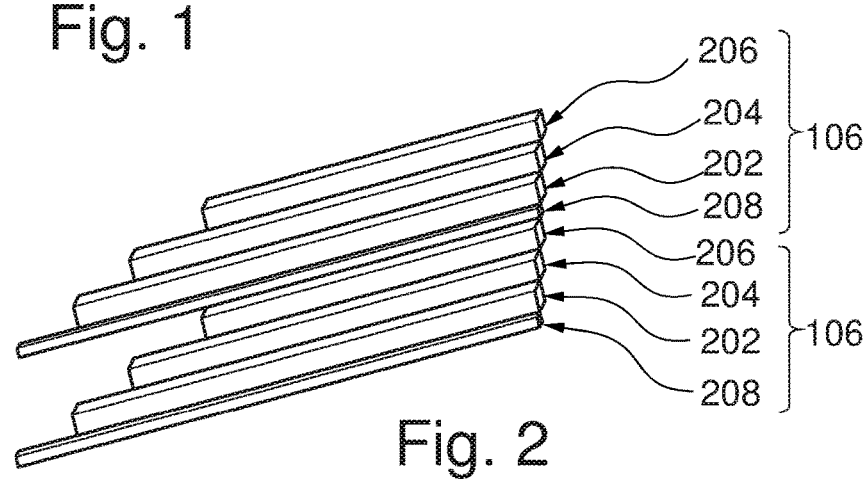
FIG. 2 is a close-up illustration of two tapes wound on a reel according to various embodiments.

FIG. 2 is a schematic cut through a portion of two tapes 106 which are wound up on the same reel 104 together. Each of the tapes 106 comprises a substrate 202 which is coated on one side with a storage layer 204 which is the data storage medium of the tape 106. In an example, the storage layer 204 is a magnetic medium, i.e. a magnetizable, magneto-readable and/or magneto-writable layer. On the opposite side to the substrate 202, the storage layer 204 is followed by a protective layer 206. In turn, the substrate 202 is coated on the opposite side to the storage layer 204 with an anti-adhesive back coating 208. The protective layer 206 is usually the face of the tape 106 which comes into immediate contact with a read/write head when used in a tape drive. The protective layer 206 may therefore also be referenced as the front face of the tape 106, with the anti-adhesive back coating 208 forming the back face of the tape 106.

FIG. 2 shows a configuration where both tapes 106 are wound on the reel 104 in the same orientation, with the back coating 208 facing inward, i.e. being oriented towards the rotary axis of the reel 104. In the depicted configuration, the back coating 208 may thus reduce the probability of adhesion of the two adjacent tapes 106.

Again, the orientation of the two tapes 106 shown in FIG. 2 is meant for illustration only, and the tape cartridge 100 may alternatively be implemented with any other configuration of tape orientations, including configurations where all tapes 106 face the rotary axis of the reel 104 with their respective front face, or an alternating configuration where one of the tapes 106 faces the axis with its front face and another one of the tapes 106 faces the axis with its back face. In the latter case, it may be advantageous to have a protective layer 206 which also features anti-adhesive properties.

Furthermore, implementations of the tape cartridge 100 are not limited to the composition of the tapes 106 shown in FIG. 2. Each of the tapes 106 may comprise additional layers not shown, less layers than the four layers shown, or a different composition where one or more of the layers shown are replaced by a different layer providing a different technical function or the same function using a different technology. For instance, the protective layer 206 and/or the substrate 202 may be made of anti-adhesive materials so that the back coating 208 can be left out. Likewise, the protective layer 206 and/or the substrate 202 may be left out if the storage layer 204 is provided with a high mechanical robustness. An example of an additional layer includes an optical storage layer 204 which allows the storage of additional information using optical devices. Yet even further, the tape cartridge 100 may still be implemented with tapes 106 where the storage layer 204 is replaced by a storage layer 204 of a different data storage technology which uses, e.g., a material which is not magnetic or magnetizable, such as an optical film, an electro-optical film, a thermoelectric film, a graphene film, or a combination thereof, with no limitation to the aforementioned tape-based data storage technologies.

Figure 3:
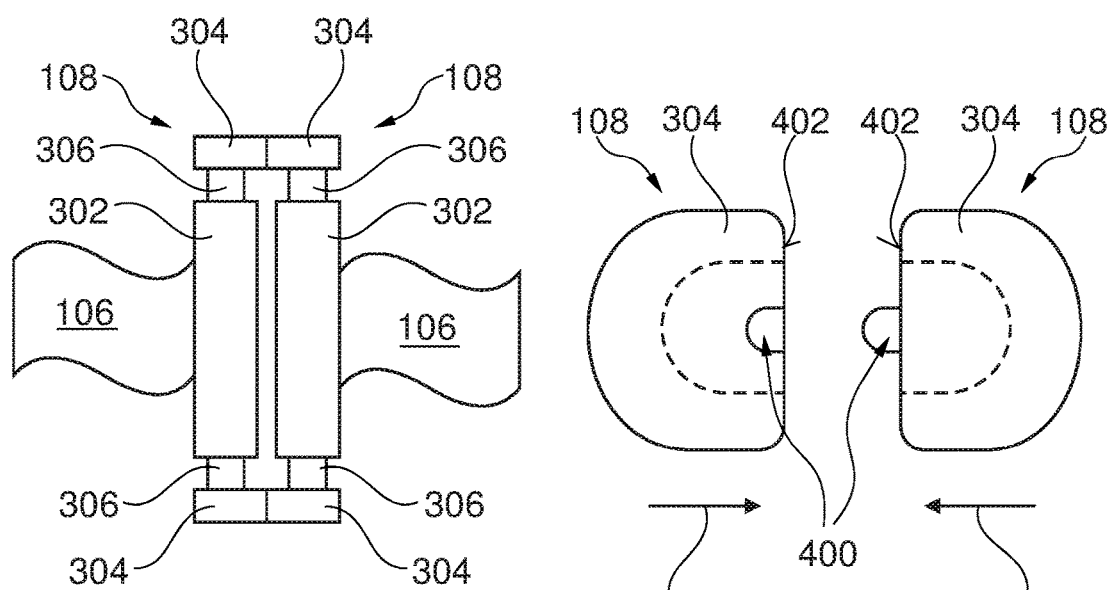
FIG. 3 is a side view of two leader pins in a connected state according to various embodiments.

FIG. 3 is a schematic side view of two leader pins 108 which are connected with each other. The tape 106 is attached to each of the leader pins 108 by a glued or clamped connection. The leader pins 108 are cylindrical bodies, which also includes cylindrical bodies with a non-circular radial cross-section and bodies which are composed of two or more cylindrical sections in the axial direction.

The leader pins 108 in the depicted example are composed of five cylindrical sections which comprise a central section 302, followed by a neck section 306 on each end in an axial direction, which in turn are followed in the axial direction by a head section 304 on each end. Both leader pins 108 may be of equal length, with a central section 302 being the longest section in the axial direction. The head sections 304 may have the widest radial dimensions. The axial dimension of the neck sections 306 is comparable to those of the head sections 304 and their radial dimensions may be about half the radial width of the head sections 304. The radial width of the central section 302 may be about 90% of that of the head section 304. The axial length of the central section 302 may be equal to or greater than the width of the attached tapes 106.

The two leader pins 108 have a parallel orientation and may be connected at both of their respective head sections 304. Due to the recessed radial dimensions of the central section 302 and the neck sections 306, a gap is formed between the two connected leader pins 108. This gap may allow for a more precise and less failure-prone synchronous fitting of the leader pins 108 with a picker of a tape drive. The gap may reduce the risk of a collision of two simultaneously moving pickers. In addition, the gap between the connected leader pins 108 may enable a more hassle free reconnection of unconnected leader pins 108. The neck sections 306 may provide a vertical stabilization to the picker and may therefore allow for a more precise guiding and positioning of the tape 106.

Figure 4:
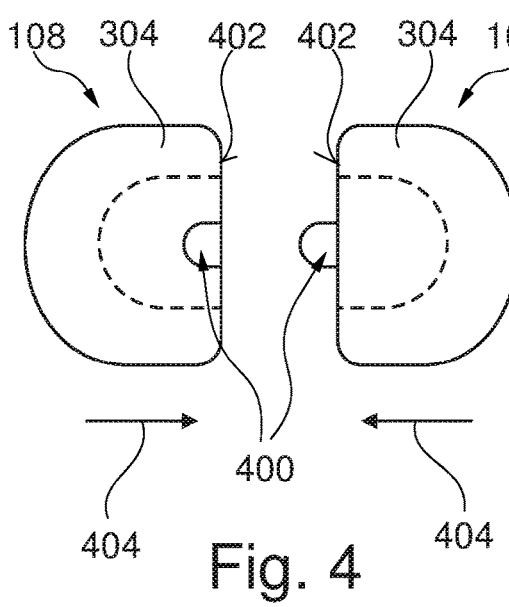
FIG. 4 is a radial cross section of two leader pins in a disconnected state, the leader pins including a joining structure according to various embodiments.

FIG. 4 shows a schematic cross-section in a radial plane through two leader pins 108 similar to those shown in FIG. 3, but this time in a disconnected state. The two disconnected leader pins 108 are oriented in parallel and arranged at equivalent axial positions so that they can be connected by a relative movement in the radial driving direction 404 which is indicated by arrows.

The depicted leader pins 108 have a radial cross-section which resembles the capital letter D, with the face which gets into contact with the head section 304 of the respective other leader pin 108 being a flat face 402, a curved face opposite of the flat face 402, and two shorter straight segments connecting the flat face 402 and the curved face. The corners of the head sections 304 are rounded. The perimeters of the respective neck sections 306, which are hidden by the head sections 304 in the view of FIG. 4, are indicated as dashed lines which also resemble the capital letter D. In connected state, the flat faces 402 of the leader pins 108 may increase the stability of the connection torsional relative movements of the leader pins 108.

Each of the leader pins 108 has a joining structure 400 disposed on the flat face 402 of its respective head sections 304. In general, the joining structure 400 may comprise a connecting element and/or a counterpart element for each leader pin 108, and these elements do not necessarily have to be located at the flat face 402 or the head section 304 of the leader pins 108. However, they have to be disposed on a surface at an axial location where the leader pin 108 is wide enough so that it can get into contact with another leader pin 108 in the joining direction 404.

In the example shown in FIG. 4, the joining structure 400 comprises a connecting element which is implemented as a stub and a counterpart element implemented as a cavity. The radial cross-section of both stub and cavity also resembles the capital letter D, with the curved surface of the stub facing outward and matching the curved surface of the cavity. The shown joining structure 400 is also intended to serve as an illustrative example only and may vary substantially in the dimensions and shapes of its respective elements. In the depicted example, the stub and the cavity have a width of about 20% of the width of the flat face 402, and a length in the joining direction 404 of about 20% of the diameter of the perimeter of the respective head section 304 in the joining direction 404. In general, a joining structure 400 with smaller dimensions may provide an improved detachability of the connection, while a joining structure 400 with larger dimensions may provide an improved stability of the connection. In an alternative example, the stub and the cavity have a length in the joining direction 404 of 50% of the diameter of the radial perimeter of the head section 304 in the joining direction 404 to provide an improved protection of the connected leader pins 108 against unintended torsional detachment. In another alternative example, the stub and the cavity have a radial extension of 100% of said diameter, which may simplify the connecting and detaching process by enabling an exchange of air between the cavity and the environment during a movement of the stub inside the cavity.

The joining structure 400 may comprise further means, which are also called block elements herein, for securing the connection against unintended detachment. In a non-exhaustive example, the stub comprises a lateral notch and the cavity comprises a complimentary lateral bulge matching the notch. In an alternative example, the joining structure 400 comprises complimentary Velcro strips. In another alternative example, the joining structure 400 comprises permanent magnets in complimentary orientations, i.e. the permanent magnets of different leader pins 108 being oriented such that an attractive magnetic force occurs when two or more of the leader pins 108 are connected with each other in the joining direction 404. A joining structure 400 comprising permanent magnets may be especially useful for tape cartridges 100 where the storage layer 204 of the tapes 106 is not magnetizable.

In the example of FIG. 4, the left leader pin 108 is shown to comprise the cavity of the joining structure 400, while the right leader pin 108 comprises the stub of the joining structure 400. This implies the possibility that the leader pins 108 are different complimentary parts where, e.g. one of the leader pins 108 has a pure "connector" function and the other one of the leader pins 108 has a pure "recipient" function. However, it is also possible that the leader pins 108 are complimentary identical parts, where the same leader pin 108 has a stub located at its upper head section 304 and a cavity located at its lower head section 304, while the complimentary leader pin 108 has an identical structure, but is connected to its respective tape 106 in the opposite axial orientation so that the stub of each of the leader pins 108 faces the cavity of the respective other leader pin 108. Furthermore, it is possible that the same leader pin 108 comprises both a connecting element (e.g. a stub) and a counterpart element (e.g. a cavity) at the same axial position but on radially opposite locations to enable a connection of said leader pin 108 with two further leader pins 108 at the same time.

Figure 5:
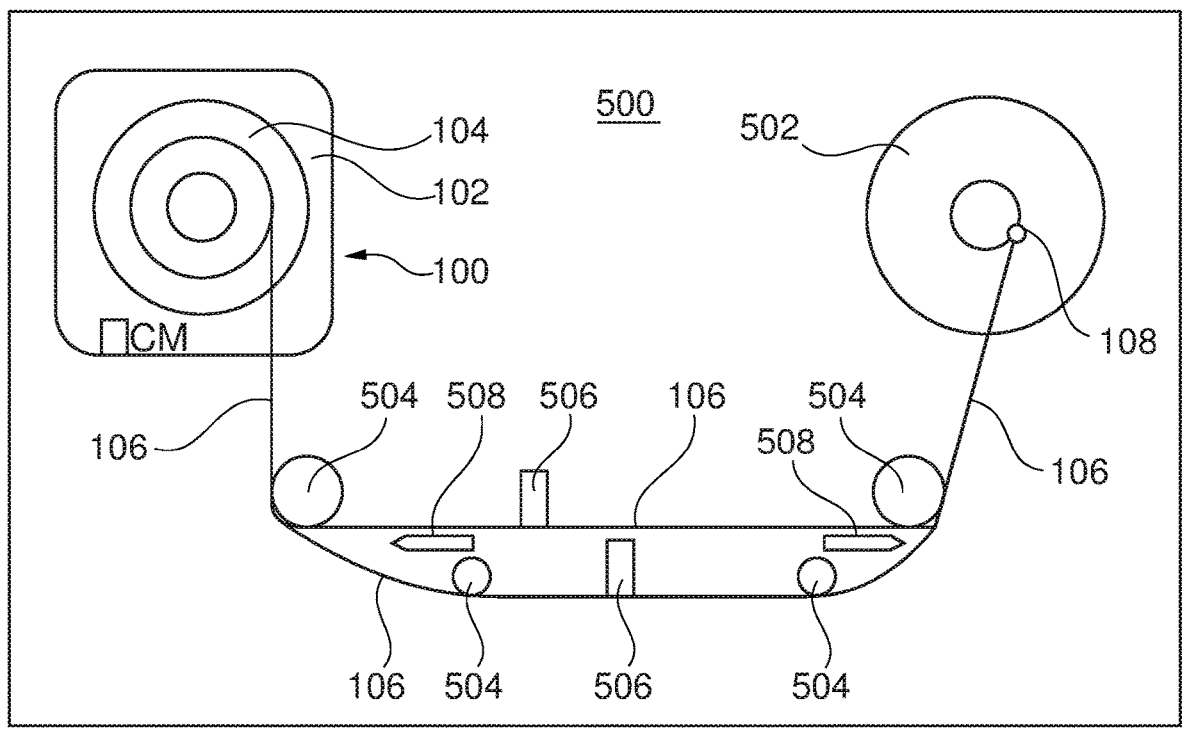
FIG. 5 depicts an exemplary tape drive in which a storage tape cartridge is mounted.

FIG. 5 is a schematic drawing of an exemplary tape drive 500 (implementing e.g. the LTO storage technology) in which a storage tape cartridge 100 is mounted according to various embodiments. The cartridge 100 comprises a housing 102, a cartridge reel 104, and two data storage tapes 106 which are wound up on the cartridge reel 104. The data storage tapes 106 each have a leader pin 108 attached to the free end of the respective tape 106. The reel 104 is rotatable around its central axis and supported by the housing 102. The housing 102 further comprises a tape outlet through which both tapes 106 have been pulled during a mount operation.

The tapes 106 are partially wound off the cartridge reel 104 and attached with their leader pins 108 in connected state to the rotary axis of a drive reel 502 located on an opposite side of the drive 500 in an analogous manner as was described before for the winding of the tapes 106 on the cartridge reel 104. Without limitation, the outer tape 106 relative to the cartridge reel 104 ("cartridge-outer tape" in the following) may be prepared to be wound up on the drive reel 502 as the inner tape 106 relative to the drive reel 502, and the inner tape 106 relative to the cartridge reel 104 ("cartridge-inner tape" in the following) may be prepared to be wound up on the drive reel 502 as the outer tape 106 relative to the drive reel 502.

The tape drive further comprises multiple rollers 504 spanning and guiding the tapes 106. A proximate one of the rollers 504 is located closest to the cartridge 100 and guides the tapes 106 on a common path section between the cartridge housing 102 and this proximate roller 504. Another proximate one of the rollers 504 is located closest to the drive reel 502 and guides the tapes 106 on a common path section between the drive reel 502 and this other proximate roller 504.

Between these two proximate rollers 504, the tapes 106 are guided along two different path sections. The cartridge-outer tape 106 may be spanned between the two proximate rollers 504 without a further roller. The cartridge-inner tape 106 is kept at a distance from the cartridge-outer tape 106 by, for example, two further rollers 504 along a path which may be essentially parallel to the path of the cartridge-outer tape 106. Each tape 106 is in contact or contactable with a dedicated tape head 506 (e.g., a read-write head) which is laterally disposed at the respective tape path. In other embodiments, additional rollers may be provided.

In various embodiments, the tape drive 500 further comprises two splitting devices 508, wherein each of which is located close to one of the proximate rollers 504 and between the two separated sections of the tape paths interconnecting the proximate rollers 504. Without limitation, the splitting devices 508 are depicted as two elongate solid pins or plates whose respective primary axes or planes are oriented essentially parallel to a connecting line of the proximate rollers 504 and which comprise a pointed end or edge facing the respective assigned proximate roller 504. In other embodiments, the splitting devices 508 may be any suitable means for separating the two tapes 106.

Various embodiments are directed to a method for mounting a tape cartridge in a tape drive. In an example, the tape drive 500 comprises a controller and a mounting system with two pickers which are adapted to perform a synchronous guided movement along a guiding means (e.g. rails or slotted guides). This may allow for controlling the tape drive 500, using the controller, to mount the tapes as follows: As the cartridge 100 is inserted, the pickers synchronously approach the cartridge opening along the guiding means, synchronously pick up the leader pins 108, which are connected with each other at the time of insertion, and synchronously pull the tapes 106 out of the housing 102, using the leader pins 108, by performing the guided movement along the guiding means in the opposite direction as during the approach. The guided movement of the pickers bends the tapes 106 around the first proximate roller 504 close to the cartridge 100.

As the pickers are guided, the first splitting device 508 close to the cartridge 100, forces are exerted on the pickers and/or the leader pins 108 in perpendicular direction relative to the movement of the pickers. This causes a disconnection of the leader pins 108. The guiding means then provides for a separate synchronous movement of the pickers, thus pulling the tapes 106 through the two separate tape paths.

After synchronously pulling both tapes 106 further along either side of the second splitting devices 508 close to the drive reel 502, the tape paths converge again and once more a force is exerted on the pickers and/or the leader pins 108 in perpendicular direction relative to the movement of the pickers, but this time in the opposite direction as during the disconnection. This causes the leader pins 108 to reconnect with each other. The mounting procedure ends by guiding the reconnected tapes 106 further along the second common section of the tape paths, thus bending the tapes 106 around the second proximate roller 504 close to the drive reel 502, approaching the drive reel 502 and engaging the reconnected leader pins 108 with the rotary axis of the drive reel 502. The pickers then release the engaged leader pins 108, enabling the drive reel 502 to wind up the tapes.

In an alternative example, a splitting means 508 is implemented as part of the guiding means, so that the leader pins 108 get pulled apart by forces which occur between the guiding means and the pickers and are transferred onto the leader pins 108 by the pickers.

Various embodiments are directed to a method for making a data storage tape cartridge. The method may begin with providing a housing, such as shown in FIG. 1. The housing may include a reel within the housing, or a reel may be positioned within the housing. The reel may be rotatably supported by the housing. The method may include an operation in which two data storage tapes are simultaneously wound on a same rotary axis of the reel. The operation may include placing one tape on top of or next to the other as shown in FIG. 2. As the two tapes are wound on the reel, each subsequent winding of a first one of the tapes is separated from a previous winding of the first tape by at least one second tape of the tapes. The method may also include attaching a leader pin to a free end of each tape.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A data storage tape cartridge, comprising:
   a housing;
   a reel, the reel being rotatably supported by the housing;
   at least two data storage tapes, the tapes being wound up on a same rotary axis of the reel, wherein each subsequent winding of a first one of the tapes is separated from a previous winding of the first tape by at least one second tape of the tapes; and
   at least two leader pins, each free end of each tape being attached to one of the leader pins.

2. The tape cartridge of claim 1, wherein each of the leader pins further comprises a joining structure to detachably join the leader pins with each other.

3. The tape cartridge of claim 2, wherein the joining structure further comprises a stub and a cavity, the cavity being adapted for receiving the stub for forming the joining of the leader pins.

4. The tape cartridge of claim 2, wherein each of the leader pins further comprises a cylindrical body, the joining structure being adapted for forming the joining in a radial joining direction of the cylindrical body.

5. The tape cartridge of claim 4, wherein the leader pins have a rated axial length, the joining structure being adapted for forming the joining of a given one of the leader pins to another one of the leader pins such that the axial length of the joined leader pins is between 95% and 105% of the rated axial length.

6. The tape cartridge of claim 4, wherein the joining structure further comprises a stub and a cavity, the cavity being adapted for receiving the stub for forming the joining of the leader pins, the joining structure of a given one of the leader pins having a radial extension, measured from a radial perimeter of the given leader pin at the axial position of the joining structure, of between 50% and 100% of the radial extension of the radial perimeter in the joining direction.

7. The tape cartridge of claim 4, wherein each of the leader pins comprises a central section and two head sections, the central section comprising two axial ends, each of the head sections being attached to one of the axial ends, the attachment between the tape and the leader pin being located at the central section, the central section having a radial extension in the joining direction of between 50% and 90% of the radial extension of the head section in the joining direction.

8. The tape cartridge of claim 7, each of the head sections being attached to the central section by a neck section, the neck section having a radial extension in the joining direction of between 50% and 90% of the radial extension of the central section in the joining direction.

9. The tape cartridge of claim 2, the joining structure being adapted for forming the joint with a positive fit.

10. The tape cartridge of claim 2, each of the leader pins comprising a flat face, the joining structure being disposed on the flat face.

11. The tape cartridge of claim 1, further comprising a stop, the stop being adapted for receiving at least a given one of the leader pins and for preventing the tape comprising the given leader pin from being further wound up on the reel.

12. The tape cartridge of claim 11, the stop further comprising an elastic element, the elastic element being adapted for exerting a force on the leader pin received by the stop, the force counteracting a movement of the tape comprising the received leader pin in a wind-up direction of the reel.

13. The tape cartridge of claim 11, the stop further comprising a lock element, the lock element being adapted for detachably engaging the at least one received leader pin with the stop.

14. The tape cartridge of claim 1, each of the tapes comprising a protective layer and an anti-adhesive back coating, the protective layer forming a front face of the tape and the back coating forming a back face of the tape, the tapes being wound up on the rotary axis of the reel with the back face facing the rotary axis of the reel.

15. The tape cartridge of claim 1, further comprising a memory, the memory storing tape-specific information for each of the tapes.

16. The tape cartridge of claim 1, comprising a single reel.

17. The tape cartridge of claim 1, each of the tapes comprising one of the following data storage media: an optical film, an electro-optical film, a thermoelectric film, a graphene film, and a combination thereof.

18. The tape cartridge of claim 1, each of the tapes comprising a magnetic film as a data storage media.

19. A method for making a data storage tape cartridge, comprising:
   providing a housing having a reel within the housing, the reel being rotatably supported by the housing;
   simultaneously winding two data storage tapes on a same rotary axis of the reel, wherein each subsequent winding of a first one of the tapes is separated from a previous winding of the first tape by at least one second tape of the tapes; and
   attaching a leader pin to a free end of each tape.

* * * * *